United States Patent [19]

Shen

[11] Patent Number: 5,546,451
[45] Date of Patent: Aug. 13, 1996

US005546451A

[54] CALL WAITING CANCELLATION DEVICE

[75] Inventor: Anthony P. Shen, Ontario, Canada

[73] Assignee: Aastra Technologies Inc., Canada

[21] Appl. No.: 455,517

[22] Filed: May 31, 1995

[51] Int. Cl.[6] .............. H04N 1/32; H04M 3/42
[52] U.S. Cl. .............. 379/215; 379/93; 379/97; 379/201; 358/434; 358/437
[58] Field of Search .............. 379/67, 88, 215, 379/93, 94, 96, 97, 208, 209, 201; 358/434, 437, 438

[56] References Cited

U.S. PATENT DOCUMENTS

| | | | |
|---|---|---|---|
| 4,661,975 | 4/1987 | Brecher | 379/215 |
| 4,852,151 | 7/1989 | Dittakavi et al. | 379/97 |
| 4,995,074 | 2/1991 | Goldman et al. | 379/97 |
| 5,287,401 | 2/1994 | Lin | 379/88 |
| 5,327,488 | 7/1994 | Garland | 379/201 |
| 5,337,351 | 8/1994 | Manabe et al. | 379/201 |
| 5,425,092 | 6/1995 | Quirk | 379/215 |
| 5,432,616 | 7/1995 | Fukao et al. | 379/215 |
| 5,432,845 | 7/1995 | Burd et al | 379/201 |
| 5,448,631 | 9/1995 | Cain | 379/211 |

FOREIGN PATENT DOCUMENTS

| | | | |
|---|---|---|---|
| 0250256 | 10/1988 | Japan | 379/215 |
| 4091546 | 3/1992 | Japan | 379/215 |

*Primary Examiner*—Jeffery Hofsass
*Assistant Examiner*—Parag Dharia
*Attorney, Agent, or Firm*—George C. Beck

[57] ABSTRACT

A device that links a telecommunication device (for example a data terminal, a telephone instrument, a message terminal or a video terminal) directly to a telephone line for cancellation of a call waiting tone. When an incoming call is received by the linked telecommunication device, the device according to the invention places the interface terminal on hold while maintaining it on line, while a special call waiting cancellation DTMF code such as "*70" is generated and transmitted. Following this action, telecommunication device is returned to the line and the original transmission is allowed to resume.

22 Claims, 8 Drawing Sheets

5,546,451

1

CALL WAITING CANCELLATION DEVICE

FIELD OF THE INVENTION

This invention relates to a device that connects a particular telecommunication device, for example, a telephone instrument or a data terminal, such as a modem or a facsimile machine, to a telephone line, and which is capable of automatically generating a call-waiting cancellation code.

BACKGROUND OF THE INVENTION

"Call waiting" is a custom calling feature offered by most telephone companies, and can be subscribed to for a nominal monthly fee. With call waiting, a second call is announced by a soft "beep." Upon hearing this beep, the subscriber normally asks a current caller to wait while the second call is answered. The second call is answered by generating a "flash" signal, typically by briefly depressing the hook switch of the telephone which indicates the handset is momentarily on-hook. At the conclusion of the second call, the subscriber is returned to the first caller.

As an added feature, the subscriber can cancel call waiting to avoid interruption during an important call or during a data transmission with, for example, a facsimile machine or another terminal using a modem. To cancel call waiting, the subscriber normally must generate "*70" for tone dialers or "1170" for pulse dialers prior to starting a call. If a call is in progress, these codes must be preceded by a flash signal. This is feasible, for example, during voice transmission if the subscriber initiates the call and is available to generate the appropriate signal.

However, it is increasingly common to utilize a telephone line for both voice and data transmission. For example, a given line might have several telecommunication devices connected to it in parallel. In such a case, various devices such as telephone instruments, answering machines, facsimile machines, modems, meter interface communication circuits (alarm systems), video terminals, or personal computers, may share a common line. A user may desire to subscribe to call waiting for voice transmission applications, but still wish to use the line for data transmissions.

In such a situation, there is a risk that a data transmission will be interrupted by a call waiting signal which may corrupt the data transmission. This risk can be eliminated for outgoing calls by preceding a call with the appropriate code to turn off call waiting. However, when an incoming data transmission takes place which is received by a facsimile machine or modem, the call waiting tone will not be canceled. Thus, the risk remains that the transmission will be temporarily interrupted by the call waiting tone, and data will be lost. This risk is particularly acute when a data terminal is left unattended to receive important transmissions, such as facsimiles or other data transmissions.

SUMMARY OF THE INVENTION

It is an object of the invention to avoid these limitations, and others, by temporarily canceling call waiting for incoming calls to a telecommunication device, particularly to a facsimile machine or a modem.

In accordance with the invention, the call waiting cancellation device utilizes a single port or multiple ports to directly link one or more telecommunication devices to a telephone line. When an incoming call is initially received by a telecommunication device connected to the call waiting cancellation (CWC) device, the CWC device temporarily

2 puts the data terminals on hold. It then generates an appropriate cancellation code ("*70" or "1170") and transmits the cancellation code to the telephone switching central office. The CWC device then returns the line back to the telecommunication device to resume the original transmission. Subsequent to this operation, no call waiting tone can be generated from a second caller during transmission, thereby preventing further interruption.

According to one aspect of the invention, the CWC device is AC powered or battery powered.

According to another aspect of the invention, the CWC device can be switched for tone or pulse line systems.

According to yet another aspect of the invention, the CWC device puts the attached terminal on hold and repeatedly generates the appropriate cancellation code at a predetermined interval which corresponds to an interval at which the local telephone company resets the call waiting feature.

According to still another aspect of the invention, other terminals sharing the same telephone line but not directly linked to the call waiting cancellation device, are unaffected by the call waiting cancellation device.

DETAILED DESCRIPTION OF THE PREFERRED EMBODIMENT

Figure 1:
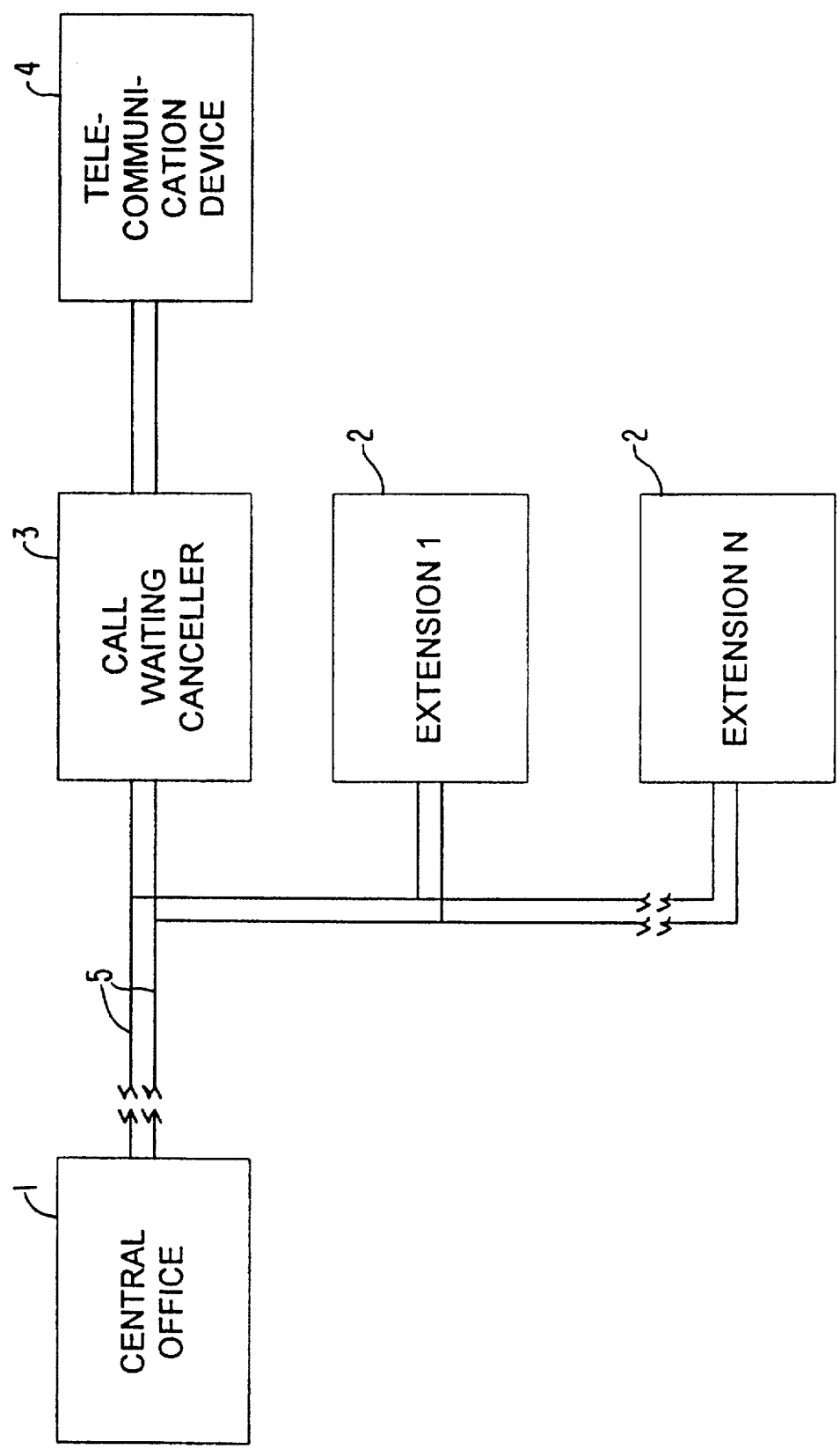
FIG. 1 is a block diagram generally illustrating a call waiting cancellation device according to the present invention.

FIG. 1 is a block diagram showing a call waiting cancellation (CWC) device according to the invention. A plurality of extensions 2 are provided at a remote location from a telephone switching central office 1 and are connected thereto via a standard telephone line, for example, a twisted pair 5. An additional extension shown as telecommunication device 4 is connected in series with the telephone line 5 through a CWC device 3. The telecommunication device 4 represents any device which transmits or receives communications signals over a telephone line, including a telephone instrument, an answering machine, a facsimile, a meter interface communication circuit or alarm system, a video or message terminal, a transaction terminal, a facsimile device, or any other device utilizing a modem for data transmission.

As explained in greater detail below, the call waiting cancellation device 3 according to this embodiment of the invention operates in two modes. In a first mode, calls are initiated by the telecommunication device 4 or are received (or initiated) by other extensions 2. In this mode, the call waiting cancellation device is passive. Thus, when an outgoing call is made from the telecommunication device 4, the call waiting cancellation device 3 has no effect on the telephone line or on the features provided from the central office 1. Similarly, the call waiting cancellation device has no effect when other extensions 2 are used exclusively of the telecommunications device 4 to place or receive a call.

In a second mode, calls are received by the telecommunications device 4. That is, in response to a ring signal received from the central office 1 over the telephone line 5, the telecommunications device 4 goes off-hook, thereby receiving the incoming call. Under these conditions, the CWC device 3 temporarily disconnects the terminal 4 from the telephone line 5 and then transmits an appropriate cancellation code to the central office 1 to cancel subsequent call waiting signals during the call. If the system utilizes tone dialing, a *70 code is transmitted; if the system utilizes pulse dialing, an 1170 code is transmitted.

Figure 2:
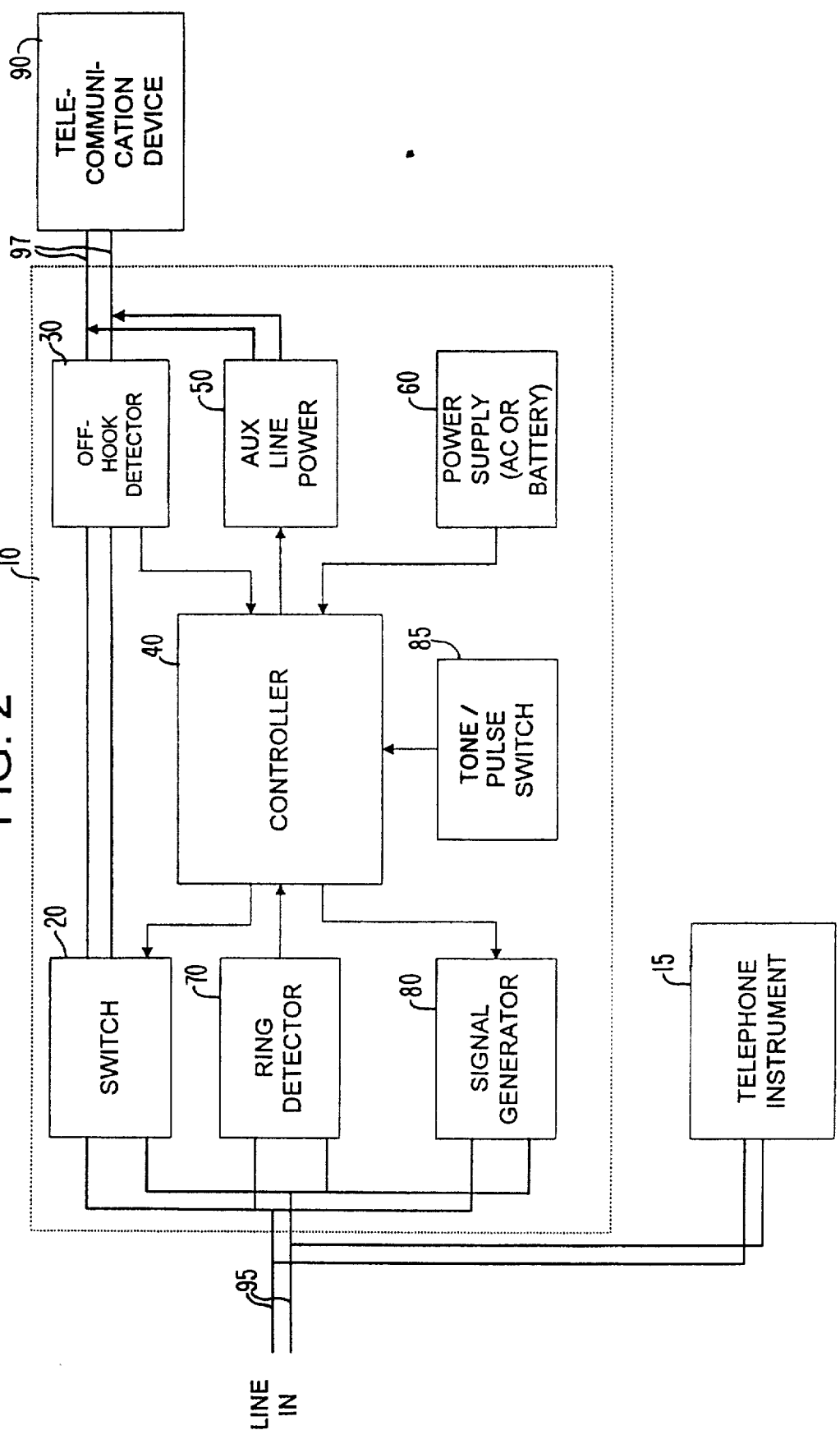
FIG. 2 is a more detailed block representation of a call waiting cancellation device according to an embodiment of the present invention.

A more detailed organization of the preferred embodiment of the invention is illustrated in the block diagram of FIG. 2 in which a CWC device 10 is shown in dashed lines. In this example, the CWC device 10 is attached in series to a facsimile machine 90. While reference is made in the following discussion of this embodiment to a facsimile machine 90, any telecommunication device may be advantageously connected to the CWC device.

As shown, the CWC device 10 is additionally connected to a standard telephone line 95. Representative of a typical arrangement, the CWC device 10 in this example is also connected in parallel to a second extension 15, shown as a telephone instrument 15.

The CWC device 10 comprises a switch 20 and an off-hook detector circuit 30 which connected in series with the facsimile machine 90 and the telephone line 95 from the central office. Both the switch 20 and the off-hook detector circuit 30 are operatively coupled to a controller 40. Also connected to the telephone line 95 are a ring detector circuit 70 and a signal generator 80. Both of these circuits are connected to the controller 40. Also provided is a tone/pulse switch 85 which indicates the type of service subscribed to. As shown, the controller 40 is connected to both a power supply 60 and an auxiliary line power circuit 50. The power supply 60 provides power to the CWC device from either a rectified AC supply or from a DC supply, such as a battery, in accordance with conventional techniques.

In this example, when an incoming call is received from the telephone line 95, a ringing signal passes through the switch 20 (maintained in a closed position) and through the off-hook detector circuit 30 to the facsimile machine 90. At the same time, the incoming ringing signal also passes through the ring detector circuit 70. On detecting a ringing signal, the ring detector circuit 70 notifies the controller 40 of an incoming call. Thereupon, the controller 40 instructs the off-hook detector 30 to monitor the line 97 going to the facsimile machine 90.

Figure 3:
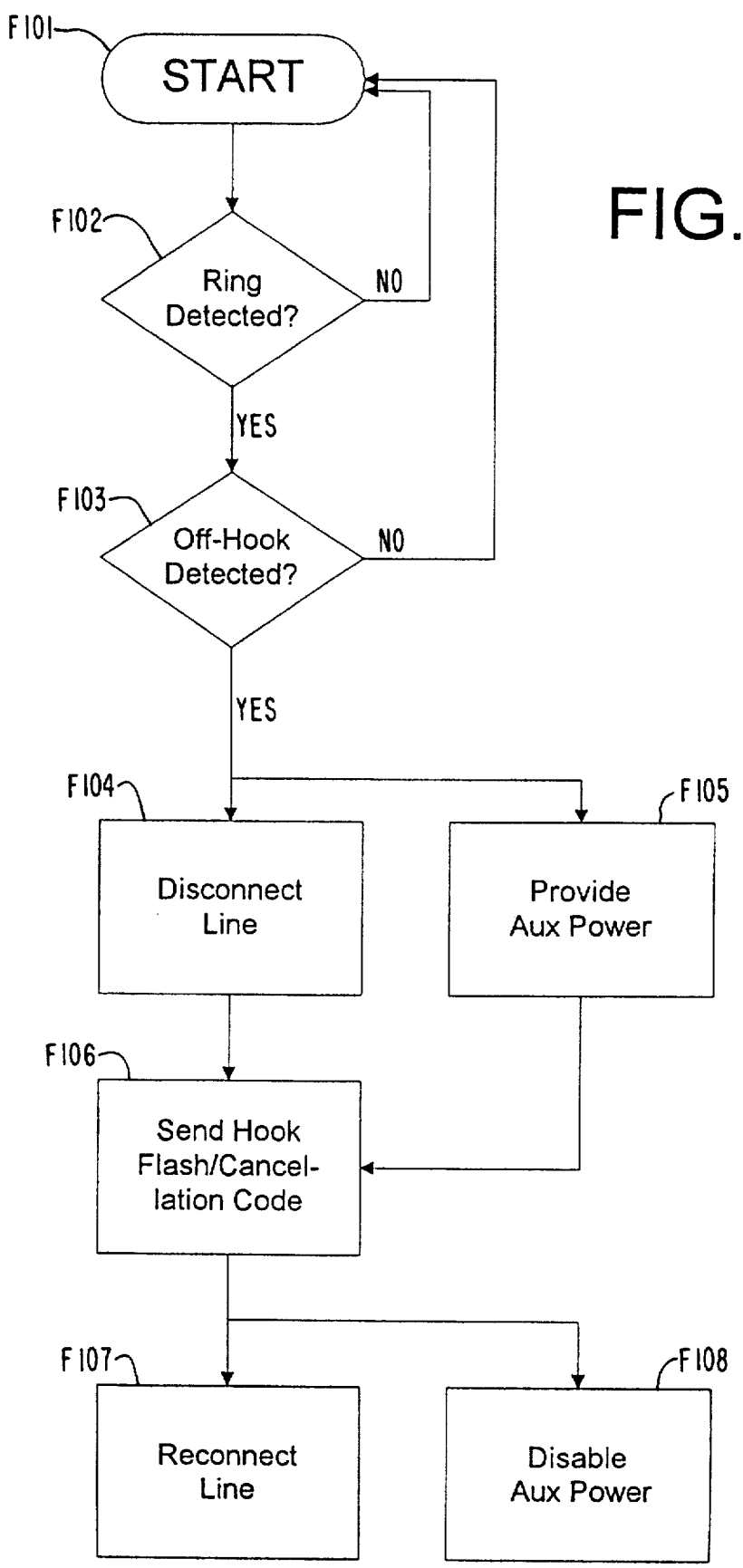
FIG. 3 is a flow chart illustrating the operation of a call waiting cancellation device according to an embodiment of the present invention.

The operation of the controller of FIG. 2 is shown in FIG. 3. Step F101 begins with the CWC device 10 operating in the first mode referred to above. In this state, the controller 40 monitors the incoming line 95 at step F102 through ring detector circuit 70. As long as no ring is detected, the CWC device 10 remains in the first mode. However, if a ring is detected, the controller then, at step F103, determines through off-hook detector circuit, 30 whether the device connected to the outgoing line 97 is off-hook. If not, the CWC device 10 again remains in the first mode.

As shown in FIG. 2, the extension telephone 15 is connected in parallel to the CWC device 10. As such, even if the ring detector 70 detects a ringing signal, the off-hook detector 30 will not detect an off-hook condition for the device connected to the outgoing line 97. Thus, the result at step F103 will be a "no" when the extension goes off-hook, and therefore the controller will not activate subsequent call waiting cancellation sequences represented in FIG. 3 by steps F104 to F108.

On the other hand, if the controller 40 determines that the device connected to the outgoing line 97 has gone off-hook in response to an incoming call, at step F104, the controller 40 instructs the switch 20 to disconnect the connection between the incoming line 95 and the outgoing line 97. Because many devices, such as facsimile machines, are designed to automatically terminate transmission or reception when a disconnect is detected, at step F105, the controller optionally may instruct the auxiliary line power circuit 50 to provide a nominal tip-ring voltage of, for example, 5 V or more, to the outgoing line 97. In the example shown in FIG. 2, this prevents the facsimile machine 90 from terminating the call.

Following the disconnection of the device 90 to incoming line 95, at step 106, the controller 40 instructs the signal generator 80 to send a hook flash signal, and then a call waiting cancellation code to the central office. If the tone/pulse switch 85 indicates that a pulse dialing is used, the code "1170" is transmitted. On the other hand, if the tone/pulse switch 85 indicates that tone dialing is used, the code "*70" is transmitted.

At step F108, the controller 40 then disables the auxiliary line power provided to the outgoing line 97. Approximately simultaneously, the controller 40 also controls the switch 20 to return to a closed state to reconnect the incoming line 95 with the outgoing line 97 to the facsimile machine 90 (step F107).

In this embodiment, once the cancellation code has been sent and the transmission resumed, the controller 40 then waits for the call to terminate. For example, the controller 40 could be suitably programmed to permit an interrupt from the off-hook detector 30 which indicates that the outgoing line 97 has returned on-hook. At such a time, the CWC device is returned to the first mode at step F101 and the sequence resumes.

Figure 4:
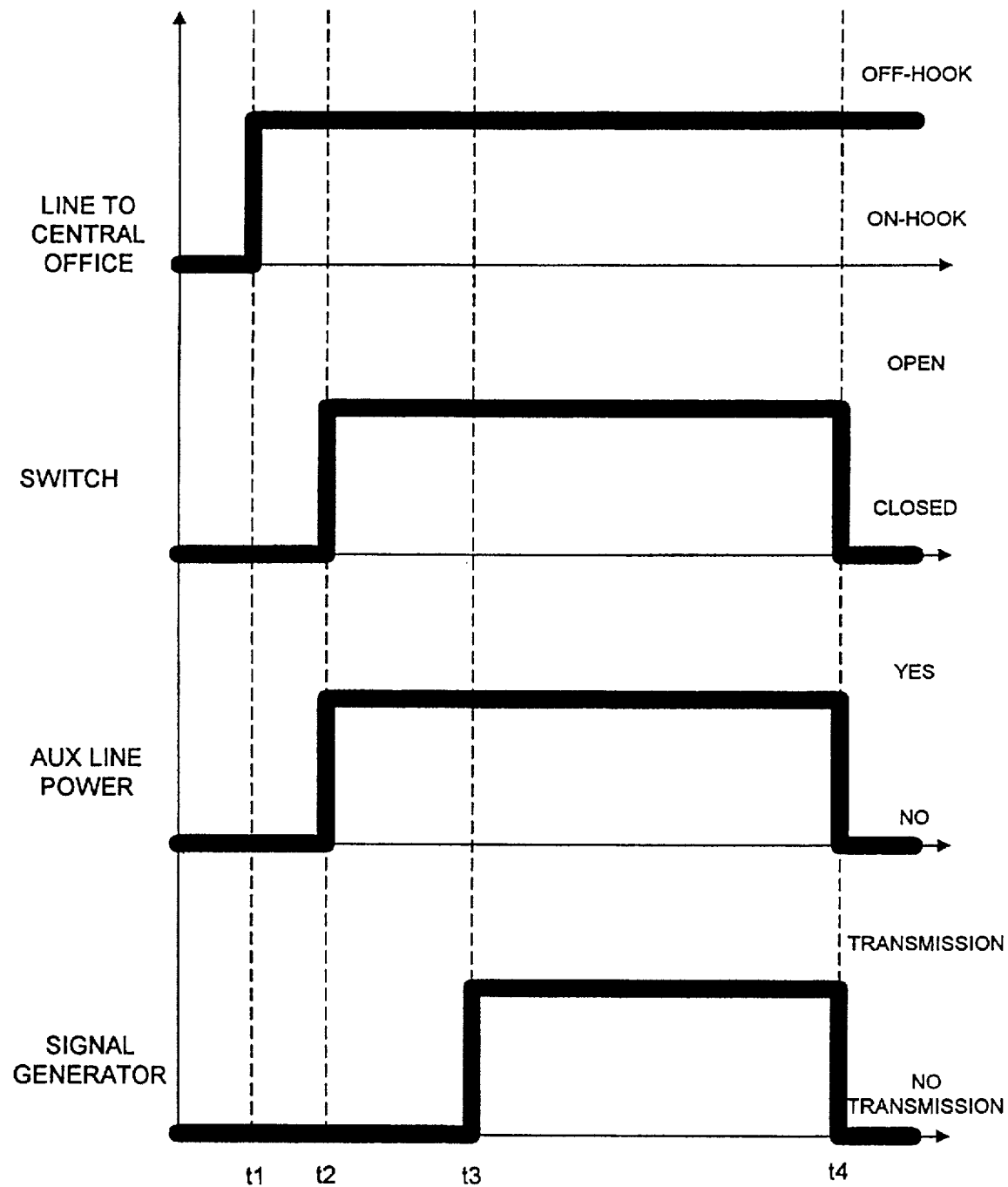
FIG. 4 is a timing diagram relating to an embodiment of the present invention.

FIG. 4 generally shows the time sequence of the actions taken by the CWC device according to the invention in an idealized plot. The overall time dependent action of the CWC device begins after the outgoing line to a telecommunication device connected to the CWC device is taken off-hook (for example, after a "yes" result is detected at step F103). As shown, at a time $t_1$, the device connected to the CWC device takes the line to the central office off-hook. At a subsequent time $t_2$, the switch within the CWC device which controls the connection between the incoming line from the central office and the outgoing line to the connected device switches from a closed position to an open position, thereby disconnecting the outgoing line from the central office. At or near time $t_2$, auxiliary line power is supplied to the outgoing line to ensure that the connected device does not automatically disconnect. Beginning at time $t_3$, the signal generator within the CWC device generates a cancellation code which is provided to the line to the central office. Finally, at time $t_4$, the signal generator's transmission terminates, and the switch is closed and the auxiliary power is discontinued.

In order to ensure that the connected device has properly taken the line off-hook, the interval ($t_2$–$t_1$) should not be too short. On the other hand, where the connected device is, for example, a facsimile machine, this time interval should not exceed approximately 2 seconds, otherwise, the facsimile machine may begin transmission of data signals before the call is resumed. Preferably, the interval ($t_2$–$t_1$) should be approximately 500 ms.

From the perspective of the central office, the disconnection of the incoming line and the outgoing line to the connected device is equivalent to an on-hook condition. The time between the switch opening at $t_2$ and the time at which signal generator opens the line at $t_3$, a hookflash signal is transmitted to the central office. Accordingly, the hook flash signal precedes the generation of a call waiting cancellation code. Care must be exercised to ensure that the hook flash signal is interpreted correctly by the central office. If this action is too fast, the central office will not interpret the signals as a hook flash. On the other hand, if the momentary on-hook condition is too long, the central office will disconnect the line. Generally, the momentary on-hook condition interval $t_3$–$t_2$ should be between 300 and 1100 ms.

During the interval $t_4$–$t_3$, the signal generator within the CWC device sends the appropriate call waiting cancellation code. For most areas in North America, the tone code is "*70" and the pulse signal is 1170. Preferably, the appropriate one of these signals should be sent within 200 to 500 ms in order for the central office to terminate the call waiting service for the duration of the call.

In this embodiment, the overall time ($t_4$–$t_1$) for the connected device to take the incoming line off-hook and then for the CWC device to return the line back to the connected device is approximately 1.5 seconds. When the connected device is a facsimile machine, it will typically be attempting to establish a connection with the calling party by transmitting the appropriate signals. However, the delay of 1.5 seconds will normally not be long enough to cause the facsimile machine to determine that an error has occurred or to disconnect from the line.

Figure 5:
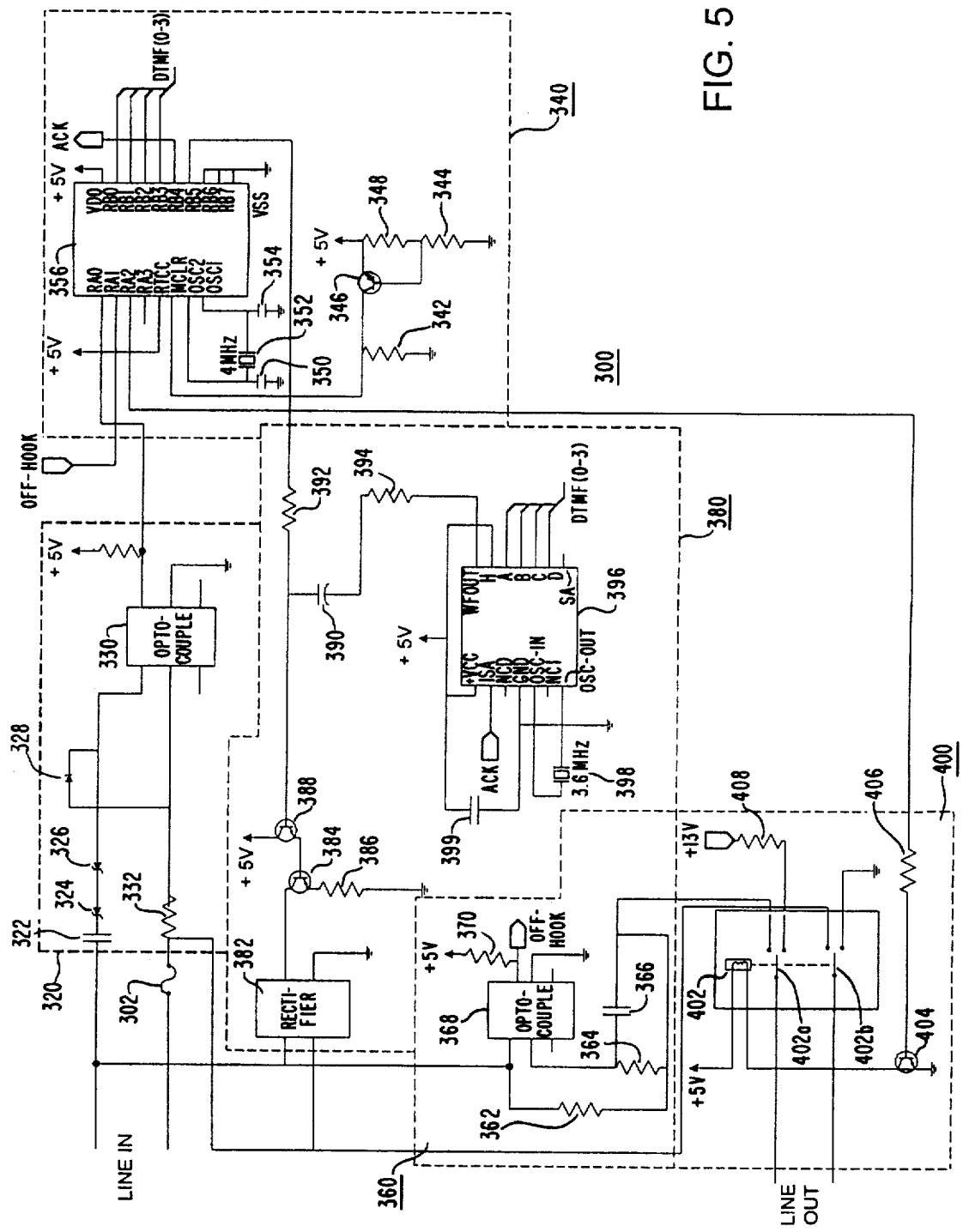
FIG. 5 is a diagram showing a more detailed circuit configuration for an embodiment of the present invention.

FIG. 5 is a circuit diagram illustrating a preferred embodiment of a CWC device 300 according to the invention. Shown in dashed lines are the main components of the CWC device 300. These include a ring detector circuit 320, a controller circuit 340, an off-hook detector circuit 360, a signal generator circuit 380, and a switch/auxiliary power circuit 400.

As shown in FIG. 5, the LINE IN from a central office is coupled to the ring detect circuit 320 and to the off-hook detector circuit 360 via a fuse 302. The LINE OUT to a telecommunication device connected to the CWC device 300 is coupled to the switch/auxiliary power circuit 400. As shown, the switch/auxiliary power circuit 400 selectively couples the line out to either the LINE IN or to a +13 V power supply via a resistor 408 in accordance with a logic Signal supplied from the controller circuit 340.

In this example, the ring detector circuit 320 comprises a capacitor 322 connected in series with two zener diodes 324 and 326, a resistor 332 coupled in series with the fuse 302, and an ac optocouple 330 (in this example, a Motorola optocouple, part no. H11AA2) which provides a logic signal to the controller circuit 340. Also arranged across the line in is a diode 328. Arranged as shown, this circuit detects a change in voltage across the LINE IN which occurs when a ring signal is transmitted from the central office. The optocouple 330 produces a logic signal in response to a detected ring signal.

In this example the off-hook detect circuit 360 is coupled between the LINE IN and the LINE OUT, and detects whether a point therebetween is on-hook or off-hook. As shown, the LINE IN is coupled directly to one input of a second ac optocouple 368. This line is provided to the switch circuit 400 via a resistor 362. The same line is coupled via resistor 364 and capacitor 366 (arranged in parallel) to a second input to the optocouple 368. The optocouple 368 detects a change in voltage on the line connecting the LINE IN to the LINE OUT. This change in voltage indicates whether the line is off-hook or on-hook. The optocouple 368 produces a corresponding logic signal which is output to the controller circuit 340 on the signal line 370 labelled "OFF-HOOK."

As shown in FIG. 5, the switch/auxiliary power circuit 400 comprises a dual relay 402 which contains ganged switches 402a and 402b. The switches 402a and 402b selectively couple the LINE OUT to either the LINE IN or a +13 V auxiliary power source via a resistor 408. The relay is controlled according to the on-off state of a transistor 404, which operates in response to a logic signal supplied via a resistor 406 from the controller circuit 340.

The signal generator circuit 380 includes a DTMF generator component 396. In this example, a DTMF generator manufactured by SGS Thomson, part number EFG 7189 is used. As shown the DTMF generator 396 is coupled to a 3.6 MHz crystal oscillator 398. Also, the DTMF generator 396 receives logic signals comprising an ACK signal and a four bit signal (DTMF 0–3) indicative of the tone to be produced by the DTMF generator 396. In response to these inputs, the DTMF generator 396 produces an appropriate cancellation code which is provided to the LINE IN via a resistor 394, a capacitor 390, transistors 384 and 388 and a diode bridge rectifier 382 (in this example, part no. DF04 by Diodes Inc.). As shown, the base of transistor 388 is further coupled to an input of the controller circuit 340 via a resistor 392.

The main component of the controller circuit 340 consists of microcontroller 356. In this example, a Microchip PIC16C54-X microcontroller is utilized to provide appropriate DTMF logic signals to the DTMF generator 396 in response to the off-hook and ring-detect signals received respectively from the off-hook detection circuit 360 and the ring detector circuit 320. In this embodiment, the controller 356 is operatively coupled to a 4 MHz crystal oscillator 352. A reset circuit is coupled to a MCLR input to reset the microcontroller in the event of a system failure. As shown, the reset circuit comprises three resistors 342, 344 and 348 and a transistor 346.

According to this embodiment, the microcontroller 356 is suitably programmed according to manufacture specifications to implement, for example, the sequence of steps described with reference to FIG. 3. In this way, upon detection of a ring signal and a subsequent off-hook condition, the controller circuit 340 outputs a series of control signal causing the generator circuit 380 to produce an appropriate call waiting cancellation code.

Figure 6:
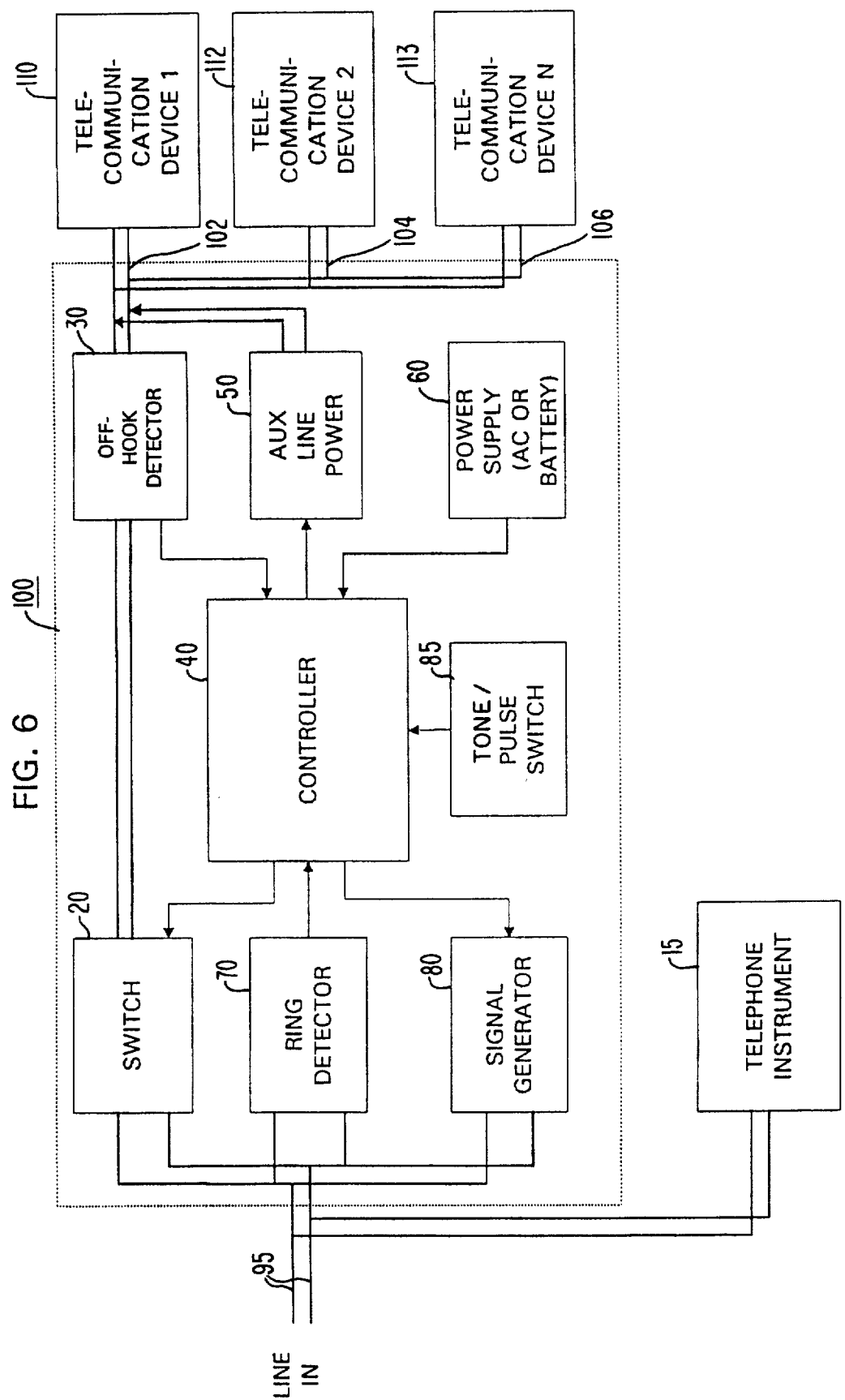
FIG. 6 is an illustration of alternate embodiment of the invention in which the device according to the invention monitors incoming calls to a plurality of extensions.

FIG. 6 shows another embodiment of the invention in which identical elements are referred to with the same reference numerals as FIG. 2. In this embodiment, a CWC device 100 according to the invention is provided with several ports (typically standard telephone line jacks) so that a plurality of telecommunication devices can be attached in parallel. In this example, when any telephone extension 110, 112, 114 connected respectively to ports 102, 104, 106 of the CWC device 100 go off-hook in response to an incoming call, the CWC device 100 will send a call waiting cancellation signal in response to an off-hook detection signal generated from the detector circuit 30.

Figure 7:
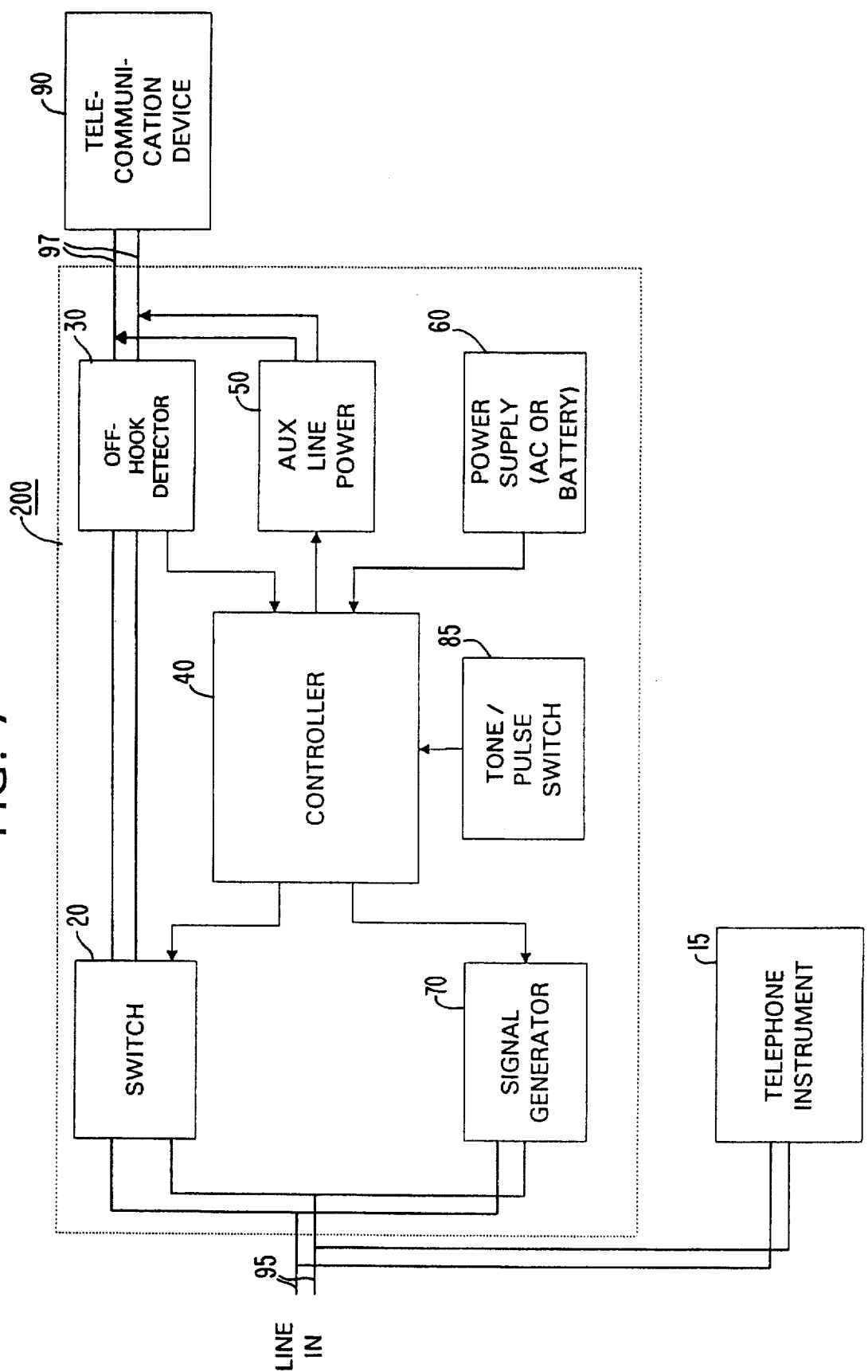
FIG. 7 is a block diagram of still another embodiment of the present invention in which both incoming and outgoing calls are monitored.

FIG. 7 illustrates a third embodiment of the invention in which a CWC device 200 sends a call waiting cancellation signal regardless of whether an incoming call is being received or an outgoing call is being placed. In this embodiment, no ring detector circuit is utilized. Accordingly, a call waiting cancellation signal is transmitted whenever a connected device, such as a facsimile machine 90, goes off-hook.

Figure 8:
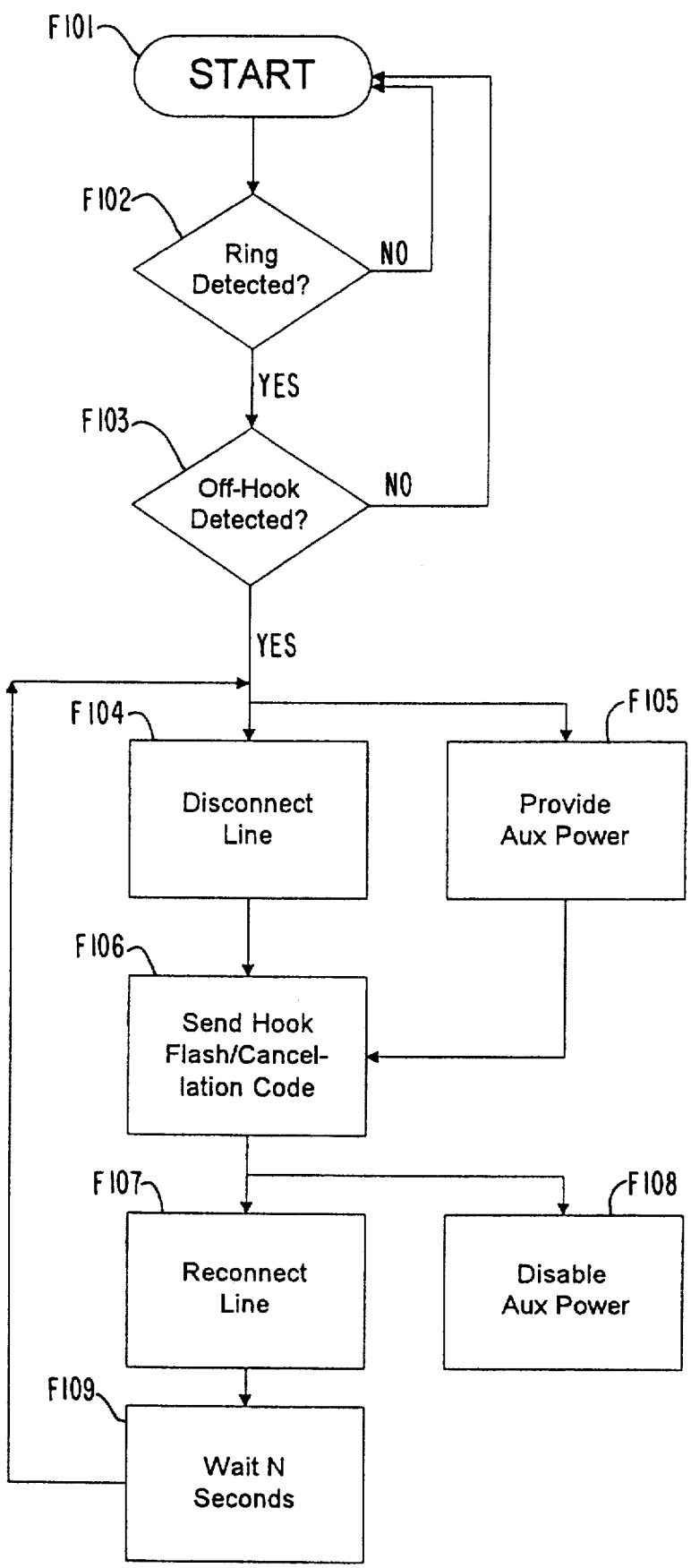
FIG. 8 is a partial flow-chart showing the operation of yet another embodiment of the present invention.

FIG. 8 is a partial flow-chart of still another embodiment of the invention. This embodiment may be advantageously utilized in areas in which the telephone switching central office periodically resets the call waiting features at a predetermined interval. In such areas, there is the risk that the central office will reset call waiting during a call even though a call waiting cancellation code was initially sent. For such areas, the controller provided in the CWC device is programmed to periodically resend the appropriate cancellation code at intervals equal to or less than the predetermined interval at which the call waiting feature would otherwise be reset. Thus, the controller is programmed to wait at a step F109 a time of N seconds which is equal or less than the predetermined interval which occurs subsequent to the initial transmission of the call waiting cancellation code. This process continues until disconnection of the call is detected.

Several specific embodiments of the invention have now been described. However, it will be appreciated by those skilled in the art that there are a number of additional ways in which the CWC device according to the invention can be implemented. In particular, the invention may advantageously be integrated into several different types of telecommunication devices or add-on modules to telecommunication devices. Such devices include distinctive ringing selection devices, facsimile machines, answering machines, telephone sets, computer systems, telephone add-on devices, meter interface communication circuits or alarm systems, and other devices using modems. Examples of such applications of the invention are now described.

As known in the art, distinctive ringing selection devices utilize a microprocessor based system to allow an effective way of sharing one line among several answering devices. Common units are the "Ring Selector" by Aastra Corporation, "ComShare" devices by Command Communications, Inc. and "Ring Director" by Lynx Automation, Inc. These devices work with a telephone company's distinctive ringing services such as those known by trade names such as RingMaster, SmartRing, Priority Ring, RingMate, Personalized Ring, Ident-A-Ring, Ident-A-Call and others. This service provides up to four numbers on a single line. Different ringing sequences or ring cadences are associated with each telephone number. With a distinctive ringing selection device, only the selected ringing sequence will be allowed to pass through. As such, if a facsimile machine is connected to a distinctive ringing selection device, it will only be activated if an incoming call is a facsimile data transmission.

Rather than the basic stand-alone design described in FIG. 1, a CWC device according to the invention may be incorporated within the same housing as the distinctive ringing selection device. In such an embodiment, a common microprocessor provides the call waiting cancellation functions described above with reference to controller 40 and also operates to provide switching among different devices connected to the same line. Other common components can provide the functional aspects of the distinctive ringer units and the CWC device.

It will be appreciated by the skilled artisan that it is a natural progression to incorporate the invention into a facsimile machine, a modem, a meter interface communication circuit or alarm system, an answering machine or other automated answering devices. Again, the CWC device can comprise a stand-alone unit incorporated under the same housing as the conventional device. Alternatively, it can be redesigned to take advantage of using the same microcontroller as the controller for the device. In such a situation, no off-hook detection circuit or switch is required.

For example, in the case of incorporation with an automated answering machine, once the answering components have taken the line off-hook, a microcontroller is programmed to temporarily put the line on hold with a hook flash signal, and then to generate a call waiting cancellation code as described above. After the code is generated, the line is then connected back to the conventional components of the terminal. Once reconnection is established, the answering machine can begin its introductory message. Similarly, a facsimile machine or modem may operate to transmit its protocol tones for initiation of data transmission once reconnection is established.

Moreover, it will be appreciated that the CWC device according to the invention may be advantageously used even with voice communication applications. Although during voice calls, the user typically wants the call waiting feature active, in certain situations, it is desirable to render call waiting inactive. For example, users of particular extensions may dislike the interruption which takes place from a second call. Such extensions can be coupled to the CWC device so that call waiting is disabled for incoming calls received by those extensions.

Alternatively, it may be desirable when a particularly important voice call is received to disable call waiting to avoid interruption. For such situations, the invention can be implemented with, for example, a manually operated button that would initiate a hook flash and then a call waiting cancellation signal.

Those skilled in the art will further appreciate the application of call waiting cancellation with personal computers having modem or facsimile capabilities. Specifically, the aforementioned features of the invention can be implemented in software. For example, CWC software could comprise part of the overall software used in a modem or a facsimile machine to answer an incoming call. In such an embodiment, the software would open the line when ringing is detected according to conventional techniques, but then also send a hook flash signal and a call waiting cancellation signal before data protocol signals are transmitted. Such a software implementation could be incorporated into the code provided in a facsimile or modem computer card. Also this software implementation can be code-embedded in existing communications software, such as Winfax by Delina of Ontario, Canada, or ProComm Plus by Datastorm of Columbia, Mo., or it can comprise add-on software.

A CWC device according to the invention can also be incorporated as part of other telephone add-on devices, such as caller identifier modules and call waiting display modules.

This automatic cancellation system can be extended to other network features such as busy call return (also known as "call again") or other network features that send signals that may interrupt ongoing data transmission.

While the invention has been described with reference to a standard telephone network, this cancellation feature can also be used in other types of networks, such as a private branch exchange (PBX).

It is to be understood that the above descriptions are only preferred embodiments of the invention. Numerous other arrangements may be devised by those skilled in the art without departing from the spirit and scope of the invention. The invention is thus limited only as set forth by the following claims.

What is claimed is:

1. A call waiting cancellation device for suppressing a call waiting signal during an incoming call comprising:

a telephone line connected to at least one telecommunications device;

switching means selectively connecting said at least one telecommunications device with said telephone line, said switching means being responsive to said incoming call;

sensing means operatively connected to said at least one telecommunications device for detecting one of an off-hook condition and an on-hook condition of said at least one telecommunications device generated in response to the said incoming call, said sensing means generating one of an off-hook signal and an on-hook signal based on the detected on-hook condition or off-hook condition of said at least one telecommunications device;

dialer signal generation means operatively connected to said telephone line for producing and transmitting suppression signals corresponding to a predetermined code which suppresses said call waiting signal during said incoming call; and controller means coupled to said switching means, said sensing means and said dialer signal generation means, wherein said controller means initiates a call waiting suppression operation upon receiving said off-hook signal from said sensing means, said call waiting suppression operation including said switching means disconnecting said at least one telecommunications device from said telephone line, and said controller means providing control signal to said dialer signal generation means instructing said dialer signal generation means to transmit said suppression signals corresponding to said predetermined code.

2. The call waiting cancellation device according to claim 1 wherein said dialer signal generation means for producing and transmitting signals corresponding to said predetermined code precedes said suppression signals with a hook flash signal transmitted on said telephone line, whereby said hook flash signal places said call on hold.

3. The call waiting cancellation device according to claim 1 further comprising ring detection means operatively connected to said telephone line for detecting a ring signal, said ring detection means providing a ring detect signal in response to said detecting to said controller means, wherein said call waiting suppression operation is initiated by said controller means upon receipt of said ring detect signal and said off-hook signal.

4. The call waiting cancellation device according to claim 1 wherein said controller means causes said switching means to connect said at least one telecommunications device to said telephone line once said suppression signals corresponding to said predetermined code have been transmitted.

5. The call waiting cancellation device according to claim 1 further comprising means connected to said controller means for supplying a voltage to said at least one telecommunications device upon said controller means receiving said off-hook signal.

6. The call waiting cancellation device according to claim 5 wherein once said suppression signals corresponding to said predetermined code have been transmitted, said voltage is no longer supplied to said at least one telecommunications device and said controller means causes said switching means to connect said at least one telecommunications device to said telephone line.

7. The call waiting cancellation device according to claim 1 or 5 wherein said at least one telecommunication device includes a facsimile machine.

8. The call waiting cancellation device according to claim 7 wherein said switching means disconnects said at least one telecommunications device from said telephone line after said off-hook signal is received within a time interval of less than two seconds.

9. The call waiting cancellation device according to claim 8 wherein said time interval is about 500 ms.

10. The call waiting cancellation device according to claim 1 wherein said at least one telecommunication device comprises a plurality of telecommunication devices, whereby said call waiting suppression operation is initiated when any of said plurality of telecommunication devices receives an incoming call from said telephone line.

11. The call waiting cancellation device according to claim 1 wherein said call waiting suppression operation is repeated at intervals no greater than a predetermined time at which call waiting is reset during said call.

12. The call waiting cancellation device according to claim 1 further comprising means for setting said dialer signal generation means to generate pulse signals or tone signals.

13. The call waiting cancellation device according to claim 1 wherein said dialer signal generation means includes a DTMF generator.

14. The call waiting cancellation device according to claim 1 wherein said call waiting cancellation device is incorporated within a unitary housing physically separate from said at least one telecommunication device.

15. The call waiting cancellation device according to claim 1 wherein said call waiting cancellation device is incorporated together with a telecommunication device.

16. In a system in which a telephone line connects a switching network to at least one telecommunications device, said switching network being capable of generating a call waiting signal during a first call in response to a second call, a method of cancelling said call waiting signal for the duration of said first call comprising the steps of:

(a) connecting said at least one telecommunications device to said telephone line, thereby coupling said at least one telecommunications device to said switching network;

(b) detecting an off-hook condition of said at least one telecommunications device;

(c) subsequent to said steps of connecting and detecting, disconnecting said at least one telecommunications device from said telephone line;

(d) subsequent to said step of disconnecting, transmitting a hook-flash signal to said switching network to place said first call on hold;

(e) subsequent to said step of transmitting said hook-flash, transmitting a call waiting cancellation code to said switching network to suppress transmission of said call waiting signal during said first call; and (f) subsequent to transmitting said call waiting cancellation code, reconnecting said at least one telecommunications device to said telephone line, thereby resuming said first call.

17. The method of claim 16 further comprising the step of detecting a ring signal generated by said switching network to initiate said first call prior to said step of transmitting a call waiting cancellation code.

18. The method of claim 16 further comprising the step of supplying a voltage to said at least one telecommunications device subsequent to said step of disconnecting, said voltage being sufficient to prevent said at least one telecommunications device from going on-hook while said call waiting cancellation code is being transmitted.

19. The method of claim 18 further comprising the step of discontinuing said supplying of said voltage once said call waiting cancellation code has been transmitted.

20. The method of claim 16 wherein said step of disconnecting said at least one telecommunications device from said telephone line occurs within a time interval of less than two seconds after said step of detecting an off-hook condition of said at least one telecommunications device.

21. The method of claim 20 wherein said time interval is about 500 ms.

22. The method of claim 16 wherein said steps (c) through (f) are repeated at intervals no greater than a predetermined time at which said switching network resets call waiting.

* * * * *